United States Patent
Berry et al.

(10) Patent No.: US 8,527,950 B2
(45) Date of Patent: Sep. 3, 2013

(54) VERIFICATION OF SOFTWARE APPLICATIONS

(75) Inventors: Edwin Charles Berry, Nashua, NH (US); Kurian John, Bangalore (IN); VinodKumar Raghavan, Woburn, MA (US); Rajesh Pravin Thakkar, Karnataka (IN); Shruti Ujjwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 12/190,376

(22) Filed: Aug. 12, 2008

(65) Prior Publication Data

US 2010/0042929 A1 Feb. 18, 2010

(51) Int. Cl.
*G06F 9/44* (2006.01)
(52) U.S. Cl.
USPC ............................ 717/124; 717/125; 717/126
(58) Field of Classification Search
USPC .................................................. 717/124–126
See application file for complete search history.

(56) References Cited

U.S. PATENT DOCUMENTS

| 6,185,729 | B1 | 2/2001 | Watanabe et al. |
| 6,854,089 | B1 | 2/2005 | Santee et al. |
| 6,983,451 | B2 | 1/2006 | Colaiuta |
| 2002/0144253 | A1* | 10/2002 | Kumhyr ........................ 717/170 |
| 2002/0162090 | A1* | 10/2002 | Parnell et al. ................. 717/120 |
| 2005/0137844 | A1 | 6/2005 | Voruganti |
| 2006/0085681 | A1 | 4/2006 | Feldstein et al. |
| 2007/0006039 | A1* | 1/2007 | Fichter et al. ................... 714/38 |

OTHER PUBLICATIONS

Mirchandani, "Using IBM Rational Functional Tester to automate testing of globalized applications", Sep. 25, 2007, IBM developerWorks, p. 1-11.*

* cited by examiner

*Primary Examiner* — Li B Zhen
*Assistant Examiner* — Duy Khuong Nguyen
(74) *Attorney, Agent, or Firm* — Hamilton, Brook, Smith & Reynolds, P.C.

(57) ABSTRACT

Disclosed is a verification method and system for a localized computer software application, the method and system comprising identifying, for a current graphical object generated by a graphical user interface of the localized application, a resource corresponding to the current graphical object; comparing the content of the current graphical object with the identified resource; and generating an error event when the content does not match the identified resource.

18 Claims, 5 Drawing Sheets

VERIFICATION OF SOFTWARE APPLICATIONS

FIELD OF THE INVENTION

The present invention relates generally to software testing and, in particular, to automated verification of localized GUI-based software applications.

BACKGROUND

Application software to be run on standard personal computers usually allows interaction with the user of the software by means of a graphical user interface (GUI). A GUI comprises graphical objects such as windows that display information and controls such as buttons or text boxes that are responsive to user commands such as mouse clicks and keyboard presses. The displayed information and labels on such controls are often in text format, comprising strings of characters in a particular alphabet making up words in a corresponding human language prevailing in the location where the application was developed. This presents a problem if the software is to be marketed in locations where the language of the original location is not widely understood. Clearly it would be excessively laborious to re-develop the application from scratch using a different language, and other location-specific features such as flag images, corresponding to each location where the software is to be marketed.

The conventional approach to this problem uses two steps, as illustrated in FIG. 4: the application developed in the original location (the "original application" 400) is first "internationalized" (410) by extracting from the GUI code the location-specific elements of the GUI such as text strings to a resource file 430, and replacing them in the "internationalized application" 420 with identifiers or references to the resource file. The internationalized application is then "localized" 440 by generating a localized resource file 460 from the resource file 430. The central activity of localization is language translation, but other activities may be required. At compilation time the resource identifiers in the internationalized application 420 are replaced by the corresponding translated resources in the localized resource file 460, resulting in a localized application 450 with an appropriately location-specific GUI.

Application software to be released to market must be rigorously tested for correctness and stability, and it is efficient to automate the process of testing as much as possible. The testing of localized software should include examining the GUI to ensure it is appropriately location-specific. Conventional approaches to testing the internationalization and localization (I&L) of software are almost completely manual. In addition to the time and expense of manual testing, manual testers could interpret I&L requirements differently, leading to variability in the tested product.

SUMMARY

It is an object of the present invention to substantially overcome, or at least ameliorate, one or more disadvantages of existing arrangements.

Disclosed are arrangements which seek to address the above problems by creating a Resource Map from an original application. The Resource Map contains mappings from GUI objects to one or more resources in the resource file. During execution of a test script in the I&L verification of the localized application, the actual content of each GUI object is compared with the mapped resource in a localized resource file. If a match is not found, an error event is generated.

According to a first aspect of the present disclosure, there is provided a verification method for a localized computer software application, the method comprising identifying, for a current graphical object generated by a graphical user interface of the localized application, a resource corresponding to the current graphical object; comparing the content of the current graphical object with the identified resource; and generating an error event when the content does not match the identified resource.

According to another aspect of the present disclosure there is provided a computer program product including a computer readable medium having recorded thereon a computer program for implementing the method described above.

Other aspects of the invention are also disclosed.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

One or more embodiments of the present invention will now be described with reference to the drawings, in which.

DETAILED DESCRIPTION

Figure 1:
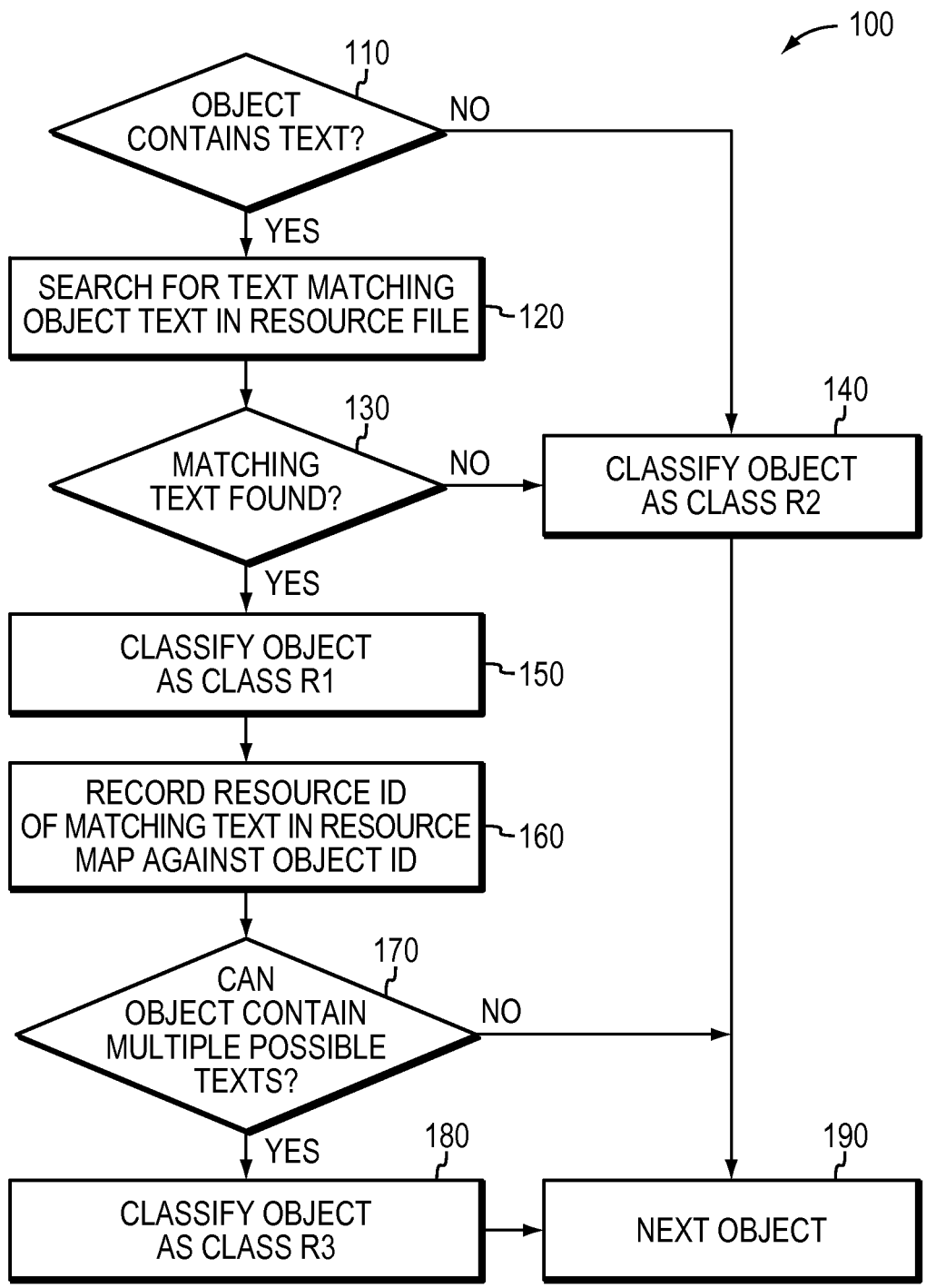
FIG. 1 is a flow diagram of a method of generating a resource map to be used for verifying a localized computer application according to the present disclosure.

Where reference is made in any one or more of the accompanying drawings to steps and/or features, which have the same reference numerals, those steps and/or features have for the purposes of this description the same function(s) or operation(s), unless the contrary intention appears.

Figure 5:
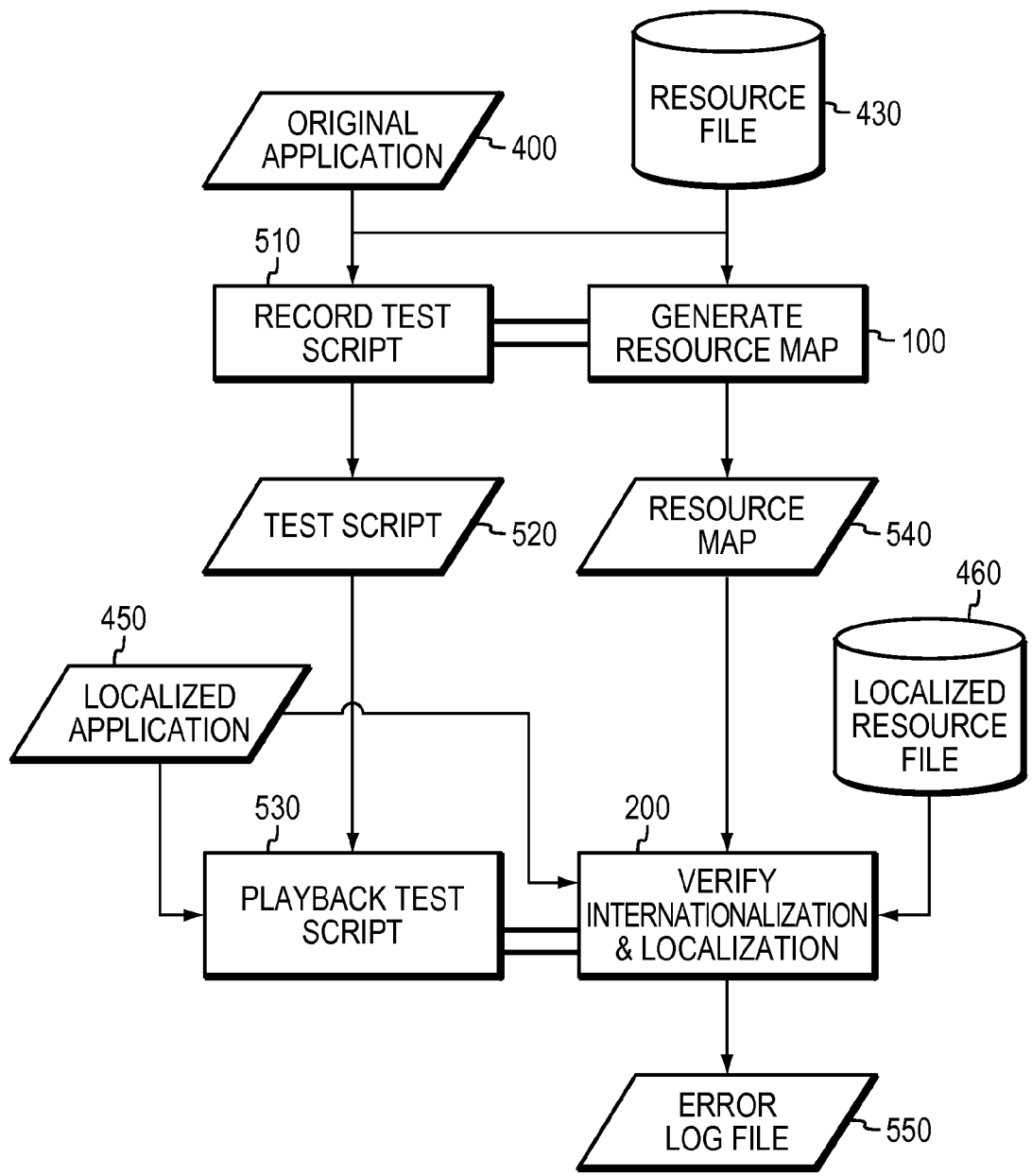
FIG. 5 is a data flow diagram showing a verification methodology within which the methods of FIGS. 1 and 2 are practised.

The disclosed methods may be used in a verification methodology that consists of two stages, as illustrated in FIG. 5: recording 510, by a tester using the original application 400 in a testing tool, a script 520 designed to test a particular functionality of the application's GUI; and playback 530 by a tester of the recorded test script 520 using the localized application 450.

Figure 2:
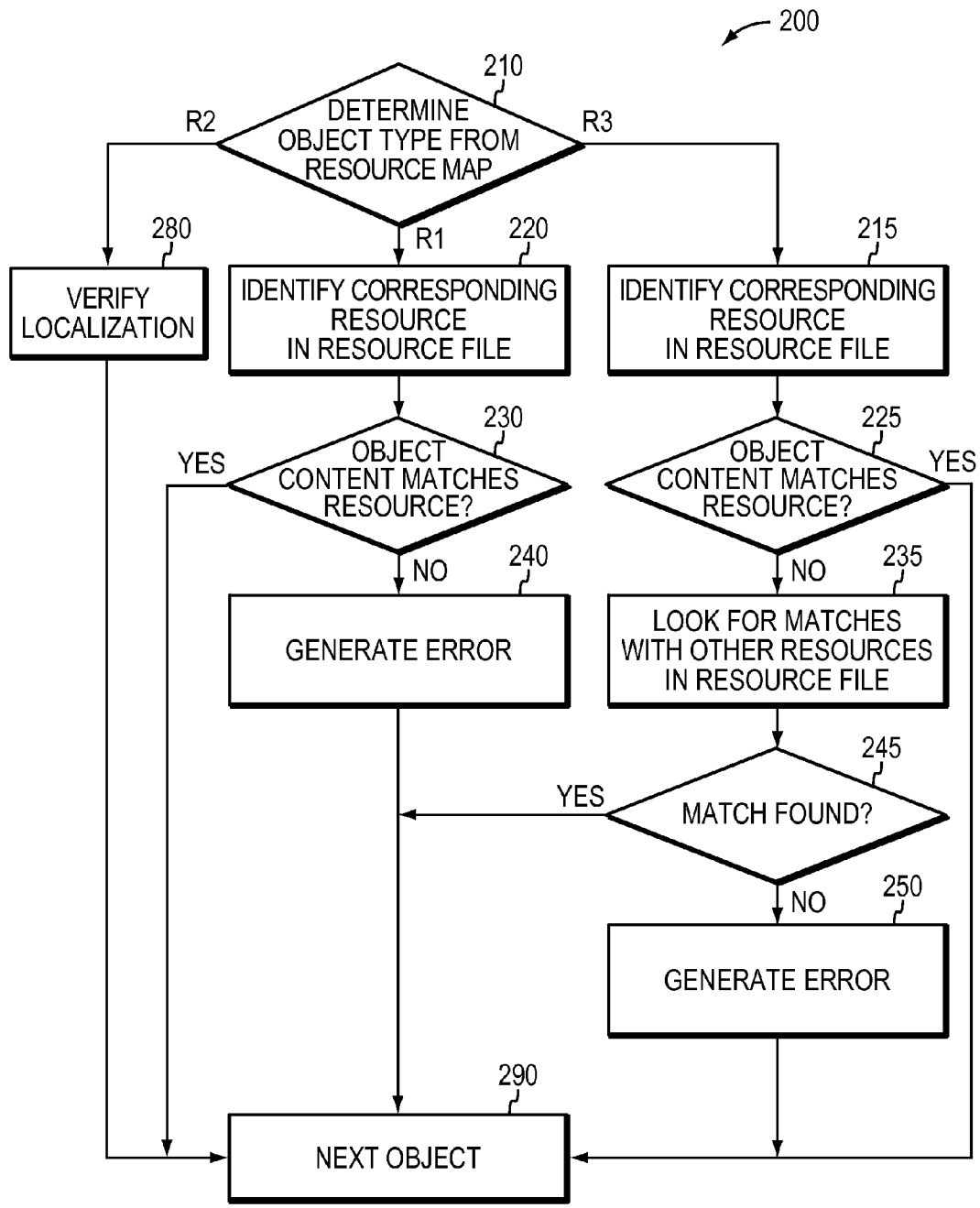
FIG. 2 is a flow diagram of a method of verifying a localized computer application according to the present disclosure using the resource map generated according to the method of FIG. 1.

FIG. 1 shows a method 100, described in detail below, of generating a resource map 540 corresponding to the recorded test script 520, during the recording 510 of the script 520 as illustrated in FIG. 5. FIG. 2 shows a method 200, described in detail below, of verifying the localization 440 of the localized application 450 using the resource map 540 generated by the method 100. The verification 200 takes place during the playback 530 of the recorded script 520 corresponding to the generated resource map 540, as illustrated in FIG. 5. The resource map generation method 100 need take place only once for the particular GUI functionality under test, whereas the verification method 200 should be carried out for each different location for which the original application 400 has been localized.

Figure 3:
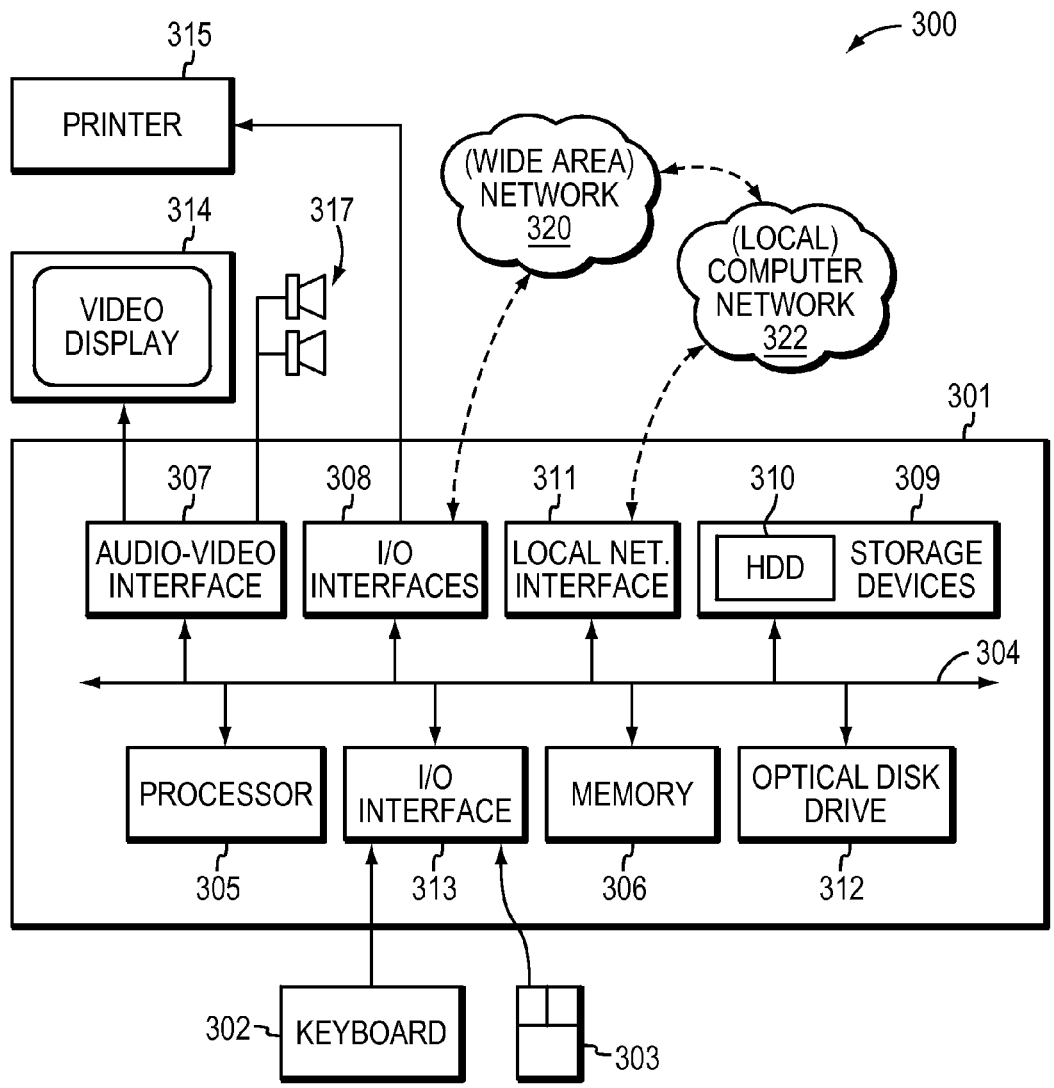
FIG. 3 is a schematic block diagram of a general purpose computer upon which arrangements described can be practised.
Figure 4:
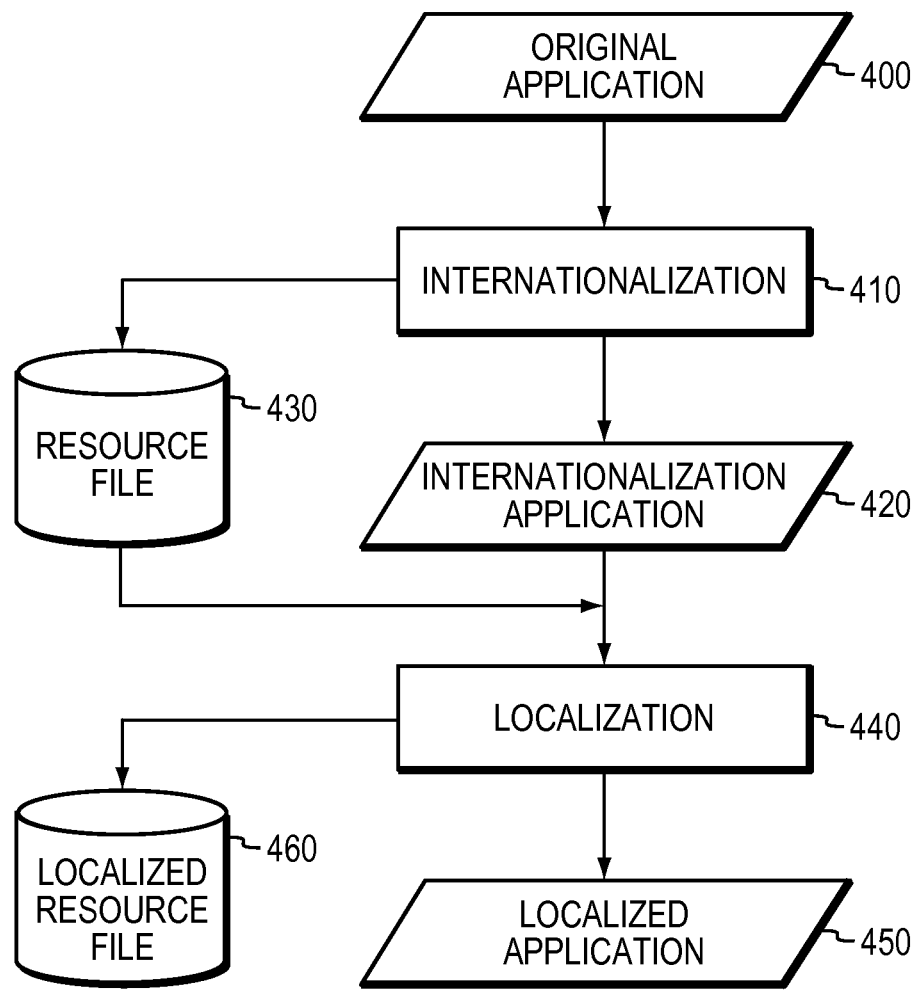
FIG. 4 is a data flow diagram of the conventional approach to internationalization and localization of a computer application program.

The methods of FIGS. 1 and 2 may be implemented using a computer system 300, such as that shown in FIG. 3 wherein the processes of FIGS. 1 and 2 may be implemented as software, such as one or more application programs executable within the computer system 300. In particular, the steps of methods 100, 200 of FIGS. 1 and 2 are effected by instructions in the software that are carried out within the computer system 300. The instructions may be formed as one or more code modules, each for performing one or more particular tasks. The software may also be divided into two separate parts, in which a first part and the corresponding code modules performs the disclosed methods and a second part and the corresponding code modules manage a user interface between the first part and the user. The software may be stored in a computer readable medium, including the storage devices described below, for example. The software is loaded into the computer system 300 from the computer readable medium, and then executed by the computer system 300. A computer readable medium having such software or computer program recorded on it is a computer program product. The use of the computer program product in the computer system 300 preferably effects an advantageous apparatus for verifying the localization of a computer program.

As seen in FIG. 3, the computer system 300 is formed by a computer module 301, input devices such as a keyboard 302 and a mouse pointer device 303, and output devices including a printer 315, a display device 314 and loudspeakers 317. The computer module 301 typically includes at least one processor unit 305, and a memory unit 306 for example formed from semiconductor random access memory (RAM) and read only memory (ROM). The module 301 also includes an number of input/output (I/O) interfaces including an audio-video interface 307 that couples to the video display 314 and loudspeakers 317, an I/O interface 313 for the keyboard 302 and mouse 303, and an interface 308 for the printer 315. The computer module 301 also has a local network interface 311 which permits coupling of the computer system 300 to a local computer network. The interfaces 308 and 313 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive and a magnetic tape drive (not illustrated) may also be used. An optical disk drive 312 is typically provided to act as a non-volatile source of data. Portable memory devices, such as optical disks (eg: CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or like computer systems evolved therefrom.

Typically, the application programs discussed above are resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the application programs may be supplied to the user encoded on one or more CD-ROM and read via the corresponding drive 312, or alternatively may be read by the user from the networks 320 or 322. Still further, the software can also be loaded into the computer system 300 from other computer readable media. Computer readable media refers to any storage medium that participates in providing instructions and/or data to the computer system 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 314. Through manipulation of the keyboard 302 and the mouse 303, a user of the computer system 300 and the application may manipulate the interface to provide controlling commands and/or input to the applications associated with the GUI(s).

The methods of FIGS. 1 and 2 may alternatively be implemented in dedicated hardware such as one or more integrated circuits performing the functions or sub functions of FIGS. 1 and 2. Such dedicated hardware may include graphic processors, digital signal processors, or one or more microprocessors and associated memories.

The method 100 of generating a resource map 540 will now be described with reference to FIG. 1. The method 100 is carried out during the recording 510 of a script 520 designed to test a particular functionality of the application's GUI, as illustrated in FIG. 5. During script recording 510, an object map (not shown) containing all currently generated GUI objects may be generated according to known methods. Method 100 is carried out repeatedly as a loop over all the GUI objects in the object map. Method 100 also makes use of the resource file 430 generated during the internationalization 410 of the original application 400 in order to determine a mapping between each object and a matching resource (e.g. a text string) in the resource file 430, if one exists. To supplement the mapping, each object is classified into one of three classes:

R1: object matches exactly one resource in the resource file 430

R2: object matches no resource (e.g. object contains a date, a time, a number etc.)

R3: object matches multiple resources in the resource file 430, depending on the execution path; for example, the object is an error message box that can contain one of several error messages.

Method 100 commences with decision step 110 which determines whether the current object in the object map contains text. If not, method 100 proceeds to step 140, which records the current object identifier in the resource map 540 with a classification of class R2. Also at step 140, in place of a resource identifier, the specific content type of the current object is manually identified by the tester and recorded in the resource map 540 alongside the object identifier.

If step 110 determines that the current object does contain text, method 100 proceeds to step 120 which searches for text matching the object text in the resource file 430. Step 130 determines whether matching text was found. If not, method 100 proceeds to step 140 described above. If so, step 150 records the current object identifier in the resource map 540 with a classification of class R1. At the following step 160, the resource identifier of the matching text in the resource file 430 is recorded in the resource map 540 alongside the current object identifier. Method 100 then proceeds to step 170, which is a manual test, performed by the tester, of whether the current object can contain multiple possible text strings. If so, step 180 follows which alters the classification of the current object in the resource map 540 to class R3. The last step 190, which follows steps 180, 140, and the "no" case of 170, obtains the next object in the object map, whereupon method 100 repeats.

A method 200 of verifying the localization of an application will now be described in detail with reference to FIG. 2. Method 200 is carried out during playback 530 of the recorded script 520 corresponding to the resource map 540 generated by the method 100 described above, as illustrated in FIG. 5. FIG. 2 shows the steps of a loop that is carried out over all GUI objects in the object map. Method 200 begins at step 210 which determines from the resource map 540 which class the object belongs to. If the class is R1, step 220 uses the resource map 540 to identify the corresponding resource in the localized resource file 460. The next step 230 compares the content of the object to the identified resource, and if there is a match, method 200 proceeds to step 290. If the content does not match the resource, an error event indicating an error has occurred in the I&L is generated and logged to an error log file 550 in step 240, and method 200 proceeds to step 290.

If step 210 returns a class of R3, step 215 uses the resource map 540 to identify a corresponding resource in the localized resource file 460. The next step 225 compares the content of the object to the identified resource, and if there is a match, method 200 proceeds to step 290. If the content does not match the resource, the class being R3 indicates that there may be possible matches in the resource file other than the identified resource, so step 235 searches for a matching resource in the localized resource file 460. If there is a match, step 245 of method 200 proceeds to step 290, but if a match is not found, an error event indicating an error has occurred in the I&L is generated and logged to the error log file 550 in step 250, and method 200 proceeds to step 290.

If step 210 returned a class of R2, the object contains content of a type such as dates, numbers, etc. as recorded in the resource map 540 at step 140. The localization of the object content is verified at step 280 depending on the recorded type, possibly generating and logging an error event to error log file 550, after which step 290 is executed.

The last step 290 of method 200 obtains the next object in the object map, whereupon method 200 repeats for that object.

The foregoing describes only some embodiments of the present invention, and modifications and/or changes can be made thereto without departing from the scope and spirit of the invention, the embodiments being illustrative and not restrictive.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A verification method for a localized computer software application, comprising:
   receiving a localized software application, the localized application being formed from an original application having a respective resource file, the respective resource file storing location specific graphical user interface elements extracted from graphical user interface code of the original application, and the localized application having a localized resource file generated from the respective resource file of the original application;
   for a current graphical object generated by a graphical user interface of said localized application, identifying in the localized resource file a resource corresponding to said current graphical object, and wherein said identifying uses a resource map to identify the corresponding resource, wherein the resource map maps graphical objects to resources in the respective resource file of the original application, and a resource in the localized resource file corresponding to one of the resources mapped for the current graphical object in the respective resource file of the original application being the identified resource;
   comparing the content of said current graphical object with said identified resource; and
   generating an error event when said content does not match said identified resource;
   wherein the resource map is different from an object map mapping graphical objects to corresponding property values, and the resource map mapping of graphical objects to resources in the respective resource file of the original application being supplemented by classification of graphical objects, each graphical object being classified into one of:
   a first class where the graphical object matches exactly one resource in the respective resource file,
   a second class where the graphical object matches no resource, and
   a third class where the graphical object matches multiple resources in the respective resource file.

2. The method of claim 1, further comprising generating said resource map by:
   comparing the content of at least one graphical object generated by a graphical user interface of an original application corresponding to said localized application with resources in an original resource file from which said localized resource file was generated; and
   recording, in said resource map, an identifier of a matching resource alongside an identifier for said graphical object.

3. The method of claim 2, further comprising, if a matching resource is not found, recording a type of said content alongside said identifier for said graphical object.

4. The method of claim 1, further comprising comparing the content of said current graphical object with at least one other resource in said localized resource file.

5. The method of claim 1, further comprising the step, before said identifying step, of determining a classification of said graphical object from said resource map.

6. The method of claim 5, further comprising the step of verifying, based on said determined classification, the content of said object using a type of said object recorded in said resource map.

7. A computer program product verifying a localized computer software application, said computer program product comprising:

a non-transitory computer readable medium having a computer program recorded therein;

the computer program including:

computer program code receiving a localized software application, the localized application being formed from an original application having a respective resource file, the respective resource file storing location specific graphical user interface elements extracted from graphical user interface code of the original application, and the localized application having a localized resource file generated from the respective resource file of the original application;

for a current graphical object generated by a graphical user interface of said localized application, computer program code identifying in the localized resource file a resource corresponding to said current graphical object, wherein said identifying includes using a resource map to identify the corresponding resource, wherein the resource map maps graphical objects to resources in the respective resource file of the original application, and a resource in the localized resource file corresponding to one of the resources mapped for the current graphical object in the respective resource file of the original application being the identified resource;

computer program code comparing content of said current graphical object with said identified resource; and computer program code generating an error event when said content does not match said identified resource;

wherein the resource map is different from an object map mapping graphical objects to corresponding property values, and the resource map mapping of graphical objects to resources in the respective resource file of the original application being supplemented by classification of graphical objects, each graphical object being classified into one of:

a first class where the graphical object matches exactly one resource in the respective resource file, a second class where the graphical object matches no resource, and a third class where the graphical object matches multiple resources in the respective resource file.

8. A method for testing of a software application, the method comprising:

creating an object map of graphical user interface (GUI) objects of a software application;

categorizing the GUI objects included in the object map;

creating a resource map by mapping the categorized GUI objects to a resource stored in a first resource file of the software application, the resource map being different from the object map mapping GUI objects to corresponding property values, and the resource map mapping of categorized GUI objects to resources in the first resource file being supplemented by classification of GUI objects, each GUI object being classified into one of:

a first class where the GUI object matches exactly one resource in the first resource file, a second class where the GUI object matches no resource, and a third class where the GUI object matches multiple resources in the first resource file;

internationalizing and localizing the software application resulting in an internationalized form of the software application and a localized form of the software application, the localized form of the software application having a localized resource file generated from the first resource file; and executing testing of the internationalized form and the localized form of the software application using the resource map to identify a corresponding resource as stored in the localized resource file, and wherein creating the resource map is during recording of a test script using the software application such that the resource map corresponds to the recorded test script, and wherein said executing testing plays back the test script using the localized form of the software application.

9. The method of claim 8, wherein the object map comprises a listing of the GUI objects in the software application and related attributes of the GUI objects.

10. The method of claim 8, wherein the GUI objects are categorized based on type and content of the GUI objects.

11. The method of claim 8, wherein the resource includes a unique resource identification.

12. The method of claim 8, wherein the localization testing is based on requirements of a predetermined locale, further wherein the resource file is different for different locale.

13. A computer apparatus verifying localized software applications, comprising:

a processor module receiving a localized software application, the localized application being formed from an original application having a respective resource file, the respective resource file storing location specific graphical user interface elements extracted from graphical user interface code of the original application, and the localized application having a localized resource file generated from the respective resource file of the original application;

a resource map stored in processor memory and mapping graphical objects to resources in the respective resource file of the original application, for a current graphical object generated by a graphical user interface of the localized software application, the resource map enabling identification of a resource, in the localized resource file, corresponding to said current graphical object;

a comparator executable by a processor and comparing content of said current graphical object with the identified resource; and an error event generator executed by the processor and logging an error event when said content does not match the identified resource;

wherein the resource map is different from an object map mapping graphical objects to corresponding property values, and the resource map mapping of graphical objects to resources in the respective resource file of the original application being supplemented by classification of graphical objects, each graphical object being classified into one of:

a first class where the graphical object matches exactly one resource in the respective resource file, a second class where the graphical object matches no resource, and a third class where the graphical object matches multiple resources in the respective resource file.

14. A computer apparatus as claimed in claim 13, wherein the resource map is generated by:

content of at least one graphical object generated by a graphical user interface of an original application corresponding to said subject software application being compared to resources in an original resource file from which the localized resource file was generated; and an identifier of a matching resource being recorded in the resource map alongside an identifier for said at least one graphical object.

15. Computer apparatus as claimed in claim 14, wherein the resource map is further generated by:

if a matching resource is not found, type of said content being recorded in the resource map alongside the identifier for said at least one graphical object.

16. Computer apparatus as claimed in claim 13, wherein the comparator further compares content of the current graphical object to at least one other resource in the localized resource file.

17. Computer apparatus as claimed in claim 13, wherein the resource map further enables a classification of the current graphical object to be determined.

18. Computer apparatus as claimed in claim 17, wherein the resource map further enables, based on determined classification, verification of the content of the current graphical object using a type of said current graphical object recorded in the resource map.

\* \* \* \* \*